US00RE41784E

(19) United States
(12) Reissued Patent
Ishimatsu

(10) Patent Number: US RE41,784 E
(45) Date of Reissued Patent: Sep. 28, 2010

(54) ADHESIVE MATERIAL

(75) Inventor: Tomoyuki Ishimatsu, Kanuma (JP)

(73) Assignees: Sony Corporation, Tokyo (JP); Sony Chemical & Information Device Corporation, Tokyo (JP)

(21) Appl. No.: 11/987,675

(22) Filed: Dec. 3, 2007

Related U.S. Patent Documents

Reissue of:
(64) Patent No.: 6,777,478
Issued: Aug. 17, 2004
Appl. No.: 09/799,634
Filed: Mar. 7, 2001

U.S. Applications:

(63) Continuation of application No. 11/504,092, filed on Aug. 15, 2006, now abandoned.

(30) Foreign Application Priority Data

Mar. 17, 2000 (JP) ..... 2000-077219

(51) Int. Cl.

| | |
|---|---|
| ***B29C 65/00*** | (2006.01) |
| ***B32B 37/00*** | (2006.01) |
| ***C08C 19/04*** | (2006.01) |
| ***C08F 8/06*** | (2006.01) |
| ***C08F 251/00*** | (2006.01) |
| ***C08F 283/04*** | (2006.01) |
| ***C08F 297/02*** | (2006.01) |
| ***C08G 18/42*** | (2006.01) |
| ***C08G 18/62*** | (2006.01) |
| ***C08J 3/00*** | (2006.01) |
| ***C08J 5/00*** | (2006.01) |
| ***C08K 3/08*** | (2006.01) |
| ***C08L 29/04*** | (2006.01) |
| ***C08L 51/00*** | (2006.01) |
| ***C08L 67/00*** | (2006.01) |
| ***C09B 67/00*** | (2006.01) |
| ***D21H 21/14*** | (2006.01) |

(52) U.S. Cl. ..... 524/439; 156/307.1; 524/502; 524/503; 524/539; 525/242; 525/263; 525/387; 525/437; 525/455

(58) Field of Classification Search ..... 156/307.1; 524/439, 502, 503, 539, 543; 525/242, 263, 525/387, 437, 451, 455
See application file for complete search history.

(56) References Cited

U.S. PATENT DOCUMENTS

| | | | |
|---|---|---|---|
| 5,475,048 | A | 12/1995 | Jamison et al. |
| 5,972,272 | A | 10/1999 | Nagase et al. |

FOREIGN PATENT DOCUMENTS

| | | | |
|---|---|---|---|
| EP | 0 979 854 | A1 | 2/2000 |
| JP | 63-168478 | | 7/1988 |
| JP | A-6-116535 | | 4/1994 |
| JP | A-6-287249 | | 10/1994 |
| JP | A-7-053895 | | 2/1995 |
| JP | A-09-041264 | | 2/1997 |
| JP | 09-169958 | | 6/1997 |
| JP | A-9-169958 | | 6/1997 |
| JP | A-9-188730 | | 7/1997 |
| JP | A-10-147762 | | 6/1998 |
| JP | 10-147762 | | 6/1998 |
| JP | A-11-100558 | | 4/1999 |
| JP | 11-100558 | | 4/1999 |
| JP | 11-284026 | | 10/1999 |
| JP | 2001-019910 | | 1/2001 |
| JP | A-2001-019910 | | 1/2001 |
| JP | 2001-019913 | | 1/2001 |
| JP | A-2001-019913 | | 1/2001 |

OTHER PUBLICATIONS

Partial Translation of "Effects of Trace Organics on Fish Phase II", Ministry of Agriculture, Foundation for Water Research UK, 1995.
Colborn T, Clement, C, Soto, A., "Development Effects of Endocrine–Disrupting Chemicals in Wildlife and Humans", 1993.

*Primary Examiner*—Patrick D Niland
(74) *Attorney, Agent, or Firm*—Oliff & Berridge, PLC

(57) ABSTRACT

The adhesive material contains a radical-polymerizable compound, a curing agent, and a thermoplastic resin; gives a negative result of the Ames test; and has a PII, or skin irritation, value of 2 or less. In particular, all the starting ingredients should preferably give a negative result of the Ames test and have a PII, or skin irritation, value of 2 or less.

6 Claims, No Drawings

ADHESIVE MATERIAL

Matter enclosed in heavy brackets [ ] appears in the original patent but forms no part of this reissue specification; matter printed in italics indicates the additions made by reissue.

*This application is a reissue continuation of Ser. No. 11/504,092 filed Aug. 15, 2006 abandoned, which is a reissue of Ser. No. 09/799,634, filed Mar. 7,2001, now U.S. Pat. No. 6,777,478.*

BACKGROUND OF THE INVENTION

1. Field of the Invention

The present invention relates to an adhesive material used for mounting bare IC chips and other electronic components on circuit boards.

2. Description of the Related Art

Insulating adhesives or anisotropically electroconductive adhesives in the form of pastes, liquids, or films are widely used as adhesive materials for the mounting of bare IC chips and other electronic components on circuit boards.

Starting materials for manufacturing these adhesives are selected with consideration for their purchase price, ease of fabrication, connection reliability, storage stability, and the like. Typical examples of starting materials selected with consideration for such factors include radical-polymerizable compounds such as bisphenol A-type epoxy resins, curing agents such as imidazole-based latent curing agents and amine-based curing agents, and thermoplastic resins such as phenoxy resins and urethane-based plastic resins. Acute biological toxicity (LD50), flammability, or the like is commonly taken into account in order to ensure that these starting materials remain safe.

Adverse biological effects are not limited to the acute toxicity caused by a one-time oral ingestion (inhalation) of a large amount of starting materials and include the poisoning symptoms, malignant tumors, and teratogenic developments brought about by long-term oral ingestion (inhalation) of minute amounts of starting materials, as well as the intense allergic reactions or the like brought about by skin contact. Despite all these, insufficient attention has so far been paid to eradicating these problems with respect to conventional adhesive materials, making it difficult to conclude that the social need for safety has been properly satisfied. In addition, environmental hormones (endocrine disruptors) that cause reproductive irregularities in living organisms (including humans) have recently become a cause for concern, but no arrangements have so far been made for manufacturing adhesive materials with full consideration for these effects.

SUMMARY OF THE INVENTION

An object of the present invention, which is aimed at addressing the above-described problems of prior art, is to provide an adhesive material particularly suited to mounting electronic components on circuit boards, wherein this adhesive material is highly safe biologically despite containing a radical-polymerizable compound, curing agent, and thermoplastic resin.

The inventors perfected the present invention upon discovering that an adhesive material that gives a negative result of the Ames test and has a PII (Primary Irritation Index), or skin irritation, value of 2 or less is extremely safe biologically.

Specifically, the present invention provides an adhesive material suitable for use during the mounting of electronic components on circuit boards, wherein this adhesive material comprises a radical-polymerizable compound, a curing agent, and a thermoplastic resin; gives a negative result of the Ames test; and has a PII, or skin irritation, value of 2 or less.

DESCRIPTION OF THE PREFERRED EMBODIMENTS

The adhesive material of the present invention is particularly suited to the mounting of electronic components on circuit boards, and is characterized by comprising a radical-polymerizable compound, a curing agent, and a thermoplastic resin; giving a negative result of the Ames test; and having a PII, or skin irritation, value of 2 or less.

The Ames test referred to herein is also known as a mutagenicity test, and is one of tests in which bacteria are used to screen chemical substances for carcinogenicity or mutagenicity. Specifically, it is a test in which a mutant strain of Salmonella or Salmonella typhimurium that lacks the ability to biosynthesize histidine is used to detect reverse mutation to produce a strain not requiring histidine (JIS K 3600 2408, JIS K 3610 1605). This mutation is the result of DNA damage, and carcinogenicity is believed to become more pronounced with increased ease of mutation. Consequently, an adhesive material having high biological safety must give a negative result of the Ames test.

The PII, or skin irritation, value is a skin toxicity index measured in accordance with the method defined by the Consumer Product Safety Commission of the USA (Draize Method; The Consumer Product Safely Commission of the USA, the Code of Federal Regulations, Title 16, Section 1500.41). A lower index corresponds to less pronounced skin irritation. In the present invention, the PII value of an adhesive material must be 2 or less. A material with a PII value greater than 2 causes discomfort in most people, and is therefore unsuitable.

The adhesive material of the present invention is such that the adhesive material in itself gives a negative result of the Ames test and has a PII value of 2 or less, as described above. As long as these conditions are met, some of the starting materials used in the preparation of the adhesive material may be mutagenic or have a PII value that is greater than 2. It is, however, preferable for all the starting materials used to give negative results of the Ames tests and to have PII values of 2 or less in order to yield an even safer adhesive material.

All the starting materials contained in the adhesive material of the present invention should preferably be non-endocrine-disruptors, particularly in order to prevent reproductive cells from being adversely affected. In this case, passive selection methods dispensing with materials known or believed to act as endocrine disruptors can be used as concrete and practical techniques for selecting non-endocrine-disruptors for the starting materials ((1) T. Colborn, C. Clement, "Chemically Induced Alterations in Sexual and Functional Development: The Wildlife/Human Connection," Princeton, N.J.: Princeton Scientific Publishing (1992); (2) T. Colborn, F. vom Saal, A. M. Soto, Environmental Health Perspective, 101, 5 (1993); (3) G. Lyons, "Phthalates in the Environment," World Wildlife UK (1995); (4) "Ministry of Agriculture, Fisheries and Food, Effects of Trace Organics on Fish, Phase II," Foundation for Water Research UK (1995).).

The radical-polymerizable compound used in the adhesive material of the present invention functions as the adhesive component of the adhesive material. Examples of such materials include unsaturated polyesters, acrylic acid esters, and methacrylic acid esters. Two or more of these may be used jointly.

Non-vinyl-based oligomers synthesized from glycols, and an unsaturated dibasic acids (maleic anhydride, fumaric acid, and the like) can be cited as examples of such unsaturated polyesters. Of these, diallyl phthalate oligomers capable of improving adhesion to ITO electrodes are preferred.

The acrylic acid esters may be acryl-based monomers or oligomers having one or more, and preferably up to four, acryloyl groups in their molecular structures. The methacrylic acid esters may be methacryl-based monomers or oligomers having one or more, and preferably up to four, methacryloyl groups in their molecular structures. Examples of preferred compounds include 1,3-butanediol methacrylate, neopentyl glycol dimethacrylate, 2-hydroxypropyl methacrylate, hydroxyethyl methacrylate, alicyclic modified neopentyl glycol acrylate, phenol ethylene oxide-modified acrylate, polypropylene glycol diacrylate, and ditrimethylol propane tetraacrylate. All these have a PII value of 0.0.

The isocyanate-derived urethane acrylate and the epoxyacrylate-based polymers (derived from bisphenol A or bisphenol F) commonly used as radical-polymerizable compounds should be dispensed with in the present invention because of their mutagenicity.

A curing agent produces dissociated radicals under the action of heat or light. An organic peroxide is preferred as such a material. A peroxydicarbonate is particularly preferred. Commonly used imidazole-based latent curing agents are mutagenic and should not be used in the present invention.

A thermoplastic resin primarily functions as the film-forming component of an adhesive material. Saturated polyester resins and [polyvinyl acetate] *polyvinyl acetal* can be cited as examples of such materials.

The starting materials of the inventive adhesive material should preferably contain electroconductive particles. The adhesive material of the present invention can therefore be used as an anisotropically electroconductive adhesive. Gold particles can be cited as preferred electroconductive particles. Common nickel particles cause skin irritation and should not be used in the present invention.

Various non-mutagenic additives whose PII values are 2 or less, such as coupling agents and compounds containing glycidyl groups, may also be used as needed to obtain the adhesive material of the present invention.

The adhesive material of the present invention can be manufactured using a common technique to uniformly mix such radical-polymerizable compounds, curing agents, and thermoplastic resins.

The adhesive material of the present invention can be used in a variety of applications involving TCPs (Tape Carrier Packages), FPCs, PWBs, glass, and plastic wiring materials, and is particularly suitable for use in the mounting of bare IC chips on circuit boards. Specifically, a bare IC chip can be connected to a wiring circuit board by a method in which the adhesive material of the present invention is fed onto the circuit board on which a bare IC chip is to be mounted, the bare IC chip is positioned thereon, and the assembly is heated under pressure.

EXAMPLES

The present invention will now be described in detail through examples.

Examples 1–3, Comparison Examples 1–2

Adhesive materials whose compositions are shown in Tables 1 and 2 were used, and anisotropically electroconductive films 30 μm in thickness were fabricated by a common technique.

Whereas the components used in Examples 1–3 were not confirmed to have any endocrine disruptive action, the radical-polymerizable compounds, curing agents, and thermoplastic resins used in Comparison Example 1 were confirmed to have a endocrine disruptive action, and similarly the radical-polymerizable compounds and thermoplastic resins used in Comparison Example 2 were not confirmed to have a endocrine disruptive action.

TABLE 1

| Component | Mutagenicity | PH value | Examples (wt. pts) 1 | 2 | 3 |
|---|---|---|---|---|---|
| Radical-polymerizable compound | | | | | |
| Polypropylene glycol diacrylate[+1] | negative | 0.0 | 35 | 20 | 15 |
| Neopentyl glycol dimethacrylate[+2] | negative | 0.0 | — | 15 | 10 |
| Phenol EO-modified acrylate[+3] | negative | 0.0 | — | — | 10 |
| Curing agent | | | | | |
| Peroxydicarbonate[+4] | negative | — | 5 | 5 | 5 |
| Thermoplastic resin | | | | | |
| Polyvinyl acetal[+5] | negative | — | 15 | 15 | 15 |
| Saturated polyester[+6] | negative | — | 35 | 35 | 35 |
| Electroconductive particles | | | | | |
| Gold particles (4.5 μm) | negative | — | 10 | 10 | 10 |

Table 1 remarks
[+1]M-225, made by Toagosei
[+2]NK Ester NPG, made by Shin-Nakamura Chemical
[+3]M-102, made by Toagosei
[+4]Percure TCP, made by Nippon Oil & Fats
[+5]Eslec BL-1, made by Sekisui Chemical
[+6]Eritel UE3200, made by Unitika

TABLE 2

| Component | Mutagenicity | PH value | (wt. pts) Comparison Ex. 1 | 2 |
|---|---|---|---|---|
| Radical-polymerizable compound | | | | |
| Bisphenol A epoxy resin[+7] | positive | — | 25 | — |
| Bisphenol A modified epoxy-acrylate[+8] | (positive) | 1.7 | — | 20 |
| Phenoxyethyl acrylate[+9] | — | 1.5 | — | 15 |
| Curing agent | | | | |
| Imidazole-based latent curing agent[+10] | positive | — | 35 | — |
| Peroxydicarbonate[+4] | negative | — | — | 5 |
| Thermoplastic resin | | | | |
| Phenoxy resin[+11] | (positive) | — | 30 | 50 |
| Electroconductive particles | | | | |
| Ni particles[+12] (4.5 μm) | (positive) | — | 10 | 10 |

Table 2 remarks
[+4]Percure TCP, made by Nippon Oil & Fats
[+7]EP-828, made by Yuka Shell
[+8]Ebecryl 150, made by UCB
[+9]SR-339, Satoma
[+10]Novacure HX3941HP, made by Asahi Chemical
[+11]PKHH, made by Tomoe Kogyo
[+12]Ni-J-20, made by Fukuda Kinzokuhaku Kogyo Evaluation The anisotropically electroconductive films fabricated according to the examples and comparison examples were subjected to the Ames test to determine mutagenicity and the Draize test to determine skin irritation in the manner described below. Measurements were also conducted in order to determine the conduction resistance and adhesive strength immediately after connection, and the conduction resistance and adhesive strength following aging.

Ames Test

This test was performed using direct reverse mutation of a mutant strain (his−) of Salmonella requiring histidine to a non-requiring strain (his+) under the action of a test substance. A specific test method involved preparing histidine-free media to which a metabolically active substance (S9) bad been added, and histidine-free media devoid of the metabolically active substance (S9). The test substance was admixed into these media, a strain (his−) requiring histidine was cultured, and the bacterial colony count of a medium containing the test substance was compared with the bacterial colony count of a medium devoid of the substance. If the first value was greater than the second, the test result was concluded to be positive, otherwise the result was concluded to be negative. The results thus obtained are shown in Table 3.

Draize Test

Hair was removed with the aid of an electric hair clipper from the lumbar regions of six healthy rabbits (body weight: 2.0–4.0 kg) to expose the skin over an area of about 10 $cm^2$. The skin on the right side of the vertebra was incised with a surgical knife over an area of 2.5 $cm^2$, creating a lesion. The skin on the left side of the vertebra was left intact, and pads obtained by applying 0.5 mL samples were affixed at two locations on the right and left of the vertebra. The pads were peeled off 24 and 72 hours following affixation, redness and swelling were visually observed, the results were graded using a five-point system (levels 0 to 4), a gross mean was obtained using the average values for each rabbit, and the gross mean value was termed the PII value. The results thus obtained are shown in Table 3.

Conduction Resistance and Adhesive Strength Immediately After Connection

An anisotropically electroconductive film slitted to a width of 2 mm was sandwiched between 200-μm pitch TAB and a 200-μm pitch PWB, the assembly was thermocompression-bonded at 160° C. and 2.94 MPa (30 $kgf/cm^2$) for 20 seconds, and the conduction resistance immediately after compression bonding and the adhesive strength resulting from 90° peeling were measured using a tensile testing machine (RTC-1210, manufactured by Orientec). The results are shown in Table 3.

Conduction Resistance and Adhesive Strength Following Aging

An anisotropically electroconductive film slitted to a width of 2 mm was sandwiched between 200-μm pitch TAB and a 200-μm pitch PWB, the assembly was thermocompression-bonded at 160° C. and 2.94 MPa (30 $kgf/cm^2$) for 20 seconds, and the conduction resistance resulting from allowing the assembly to stand for 1000 hours in an 85° C.-85% RH environment was measured together with the adhesive strength resulting from 90° peeling by means of a tensile testing machine (RTC-1210, manufactured by Orientec). The results are shown in Table 3.

TABLE 3

| | Examples | | | Comparison Ex. | |
|---|---|---|---|---|---|
| | 1 | 2 | 3 | 1 | 2 |
| Mutagenicity | negative | negative | negative | positive | positive |
| PH value | 0.0 | 0.0 | 0.0 | 5.5 | 8.3 |
| Conduction resistance (Ω) | | | | | |
| Immediately after thermocompression bonding | 0.032 | 0.032 | 0.032 | 0.032 | 0.032 |
| Following aging | 0.035 | 0.035 | 0.035 | 0.035 | 0.035 |
| Adhesive strength (gf/cm) | | | | | |
| Immediately after thermocompression bonding | 740 | 850 | 900 | 900 | 700 |
| Following aging | 700 | 730 | 850 | 850 | 700 |

The results in Table 3 indicate that the adhesive materials of Examples 1–3 have the same conduction reliability and adhesive strength as the conventional adhesive materials (Comparison Examples 1 and 2), and using only safe starting ingredients for these adhesive materials ultimately allows these materials to exhibit no discernible mutagenicity, to have a PII value of 0.0, and to remain highly safe.

The adhesive material of the present invention has the same conduction reliability and adhesive strength as conventional adhesive materials, exhibits no discernible mutagenicity, has a PII value of 2 or less, and is an extremely safe adhesive material.

The entire disclosure of the specification, summary and claims of Japanese Patent Application No. 2000-077219 is hereby incorporated by reference.

What is claimed is:

1. An adhesive material containing a radical-polymerizable compound, a curing agent, a thermoplastic resin, and electroconductive particles, wherein the radical-polymerizable compound is at least one compound selected from the group consisting of diallyl phthalate oligomer, 1,3-butanediol methacrylate, neopentyl glycol dimethacrylate, [2-hydroxpropyl methacrylate] *2-hydroxypropyl methacrylate*, hyroxyethyl methacrylate, alicyclic modified neopentyl glycol acrylate, phenol ethylene oxide-modified acrylate, polypropylene glycol diacrylate, and ditrimethylol propane tetraacrylate, and the thermoplastic resin is [a saturated polyester resin or] polyvinyl acetate, and wherein said adhesive material gives a negative result of the Ames test and having a PII, or skin irritation, value of 2 or less.

2. An adhesive material as defined in claim 1, wherein all the starting ingredients of the adhesive material give a negative result of the Ames test and have a PII, or skin irritation, value of 2 or less.

3. An adhesive material as defined in claim 1, wherein all the starting ingredients of the adhesive material are non-endocrine-disruptors.

4. A mounting method for connecting a bare IC chip to a wiring circuit board comprising feeding an adhesive material as defined in claim 1 onto a circuit board on which a bare IC chip is to be mounted, positioning the bare IC chip thereon, and heating the assembly under pressure.

5. An adhesive material as defined in claim 1 wherein the electroconductive particles are gold.

6. An adhesive material as defined in claim 1 wherein the radical polymerizable [compoundat] *compound* is at least one compound selected from the group consisting of neopentyl glycol dimethacrylate, [phenol ethylene oxide-modified acrylate,] and polypropylene glycol diacrylate.

* * * * *